Dec. 24, 1935.  R. F. ANDERSON  2,025,262
UNIT CONTROL FOR DIESEL ENGINES
Filed Dec. 3, 1930   9 Sheets-Sheet 3

INVENTOR.
Roy F. Anderson.
BY Townsend Loftus
& Abbett
ATTORNEYS.

Dec. 24, 1935.   R. F. ANDERSON   2,025,262
UNIT CONTROL FOR DIESEL ENGINES
Filed Dec. 3, 1930   9 Sheets-Sheet 4

INVENTOR.
Roy F. Anderson.
BY Townsend, Loftus & Abbett
ATTORNEYS.

Dec. 24, 1935.   R. F. ANDERSON   2,025,262
UNIT CONTROL FOR DIESEL ENGINES
Filed Dec. 3, 1930   9 Sheets-Sheet 5

INVENTOR.
Roy F. Anderson
BY Townsend Loftus
& Abbett
ATTORNEYS.

Dec. 24, 1935.    R. F. ANDERSON    2,025,262
UNIT CONTROL FOR DIESEL ENGINES
Filed Dec. 3, 1930    9 Sheets-Sheet 6

INVENTOR.
Roy F. Anderson
BY
Townsend, Loftus & Abbett
ATTORNEYS.

Dec. 24, 1935.  R. F. ANDERSON  2,025,262
UNIT CONTROL FOR DIESEL ENGINES
Filed Dec. 3, 1930   9 Sheets-Sheet 7

INVENTOR.
Roy F. Anderson.
BY Townsend. Loftus & Abbett
ATTORNEYS.

Dec. 24, 1935.   R. F. ANDERSON   2,025,262
UNIT CONTROL FOR DIESEL ENGINES
Filed Dec. 3, 1930   9 Sheets-Sheet 9

Fig.18.

INVENTOR.
Roy F. Anderson
BY Oscar A. Mellin
ATTORNEY.

Patented Dec. 24, 1935

2,025,262

UNITED STATES PATENT OFFICE 2,025,262

UNIT CONTROL FOR DIESEL ENGINES

Roy F. Anderson, San Francisco, Calif., assignor to Atlas Imperial Diesel Engine Company, Oakland, Calif., a corporation of California Application December 3, 1930, Serial No. 499,752

7 Claims. (Cl. 60—16)

This invention relates to engines operating on the Diesel cycle and particularly pertains to control mechanism therefor.

It is the principal object of the present invention to provide an improved control mechanism for Diesel engines by means of which starting, stopping, reversing and speed control may be effected through a single control member operative either at the engine or at a point comparatively remote therefrom.

In practicing the invention, I provide a control member operatively connected with the starting valve, reversing gear and flywheel brake in such a manner as to operate the same so that they will perform their various functions. The control member is similarly associated with the speed control governor so as to vary the engine speed if desired.

One form which the invention may assume is exemplified in the following description and illustrated by way of example in the accompanying drawings, in which.

Figures 1, 2:
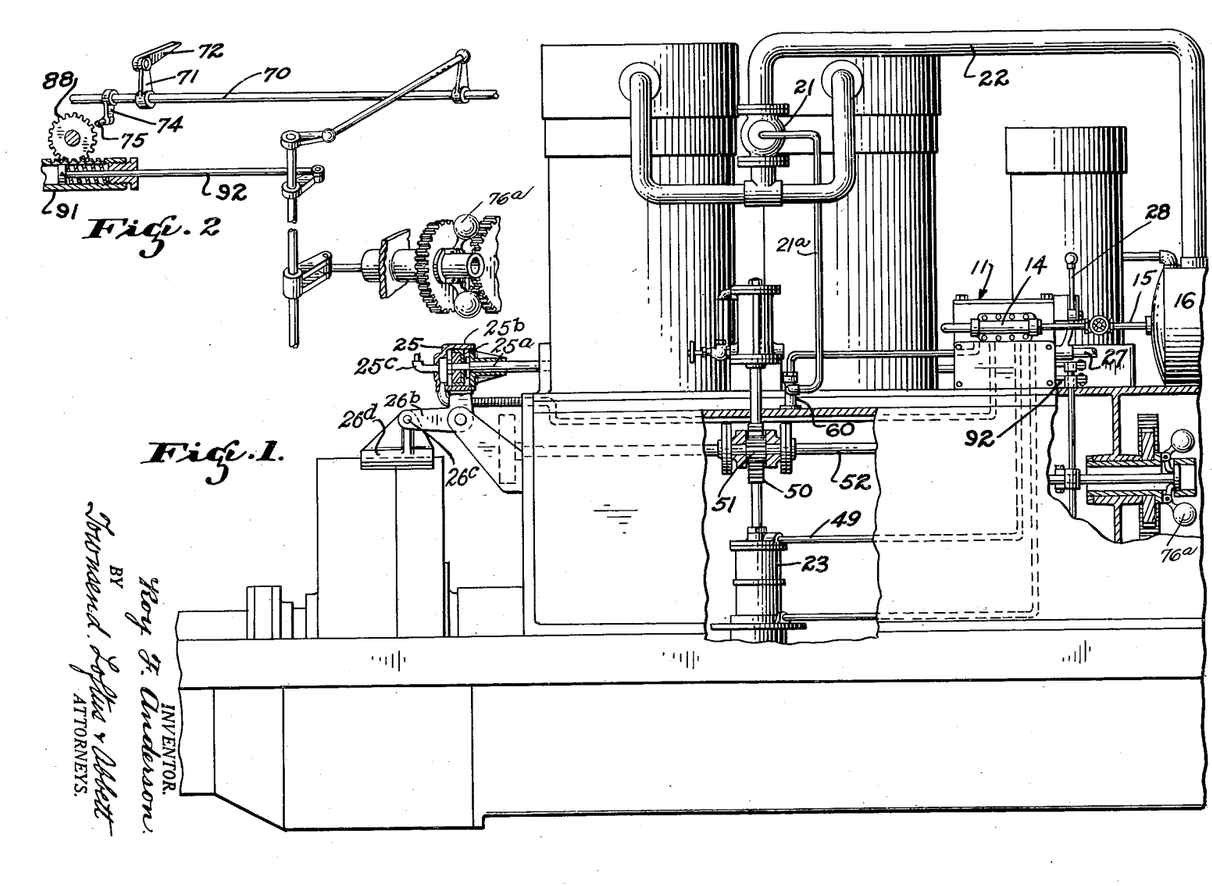
Fig. 1 is a schematic view in side elevation of a Diesel engine showing my improved unit control.
Fig. 2 is a fragmentary view in perspective showing a portion of the control mechanism for regulating the fuel supply.

Referring more particularly to the accompanying drawings, in Fig. 1, I have disclosed a Diesel engine of a standard type. This engine is fitted with a control apparatus with which the invention is particularly concerned and in the present instance the control apparatus is particularly adapted for a motor of the marine type.

This control mechanism can be operated either at the engine or at a point remote therefrom. For example, in marine motors it may be desirable under certain circumstances to control the engine from the pilot house or another point remote from the engine.

The apparatus referred to includes a control mechanism 11 which includes a housing or casing of suitable design which may be mounted adjacent to the motor. In the present instance it is shown as mounted directly on the crankcase of the engine. This housing is fitted with an air manifold 14 to which air under pressure is delivered by a conduit 15 from any suitable source of air supply under a predetermined pressure. In the present instance the source of air supply is indicated as an air reservoir 16 which is connected to the conduit 15 which in turn is connected to the air manifold 14.

Figure 7:
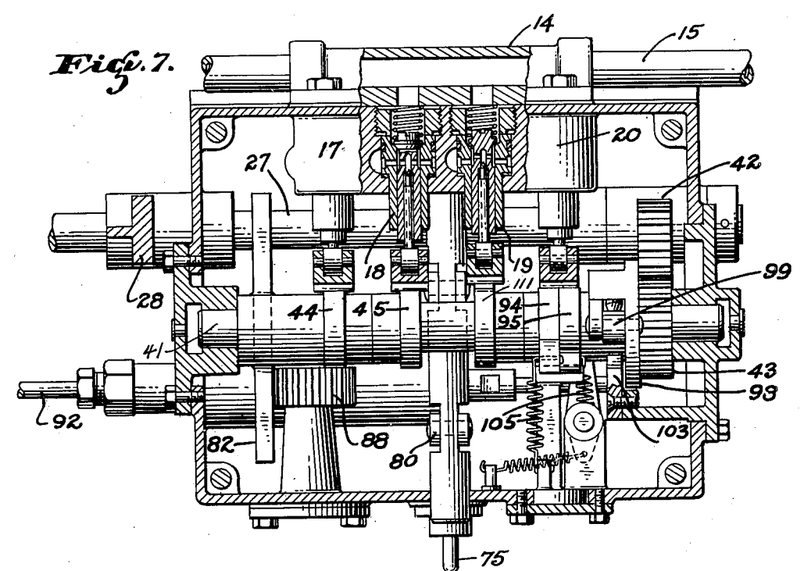
Fig. 7 is a view in plan section through the control mechanism taken on line VII—VII of Fig. 9.
Figure 8:
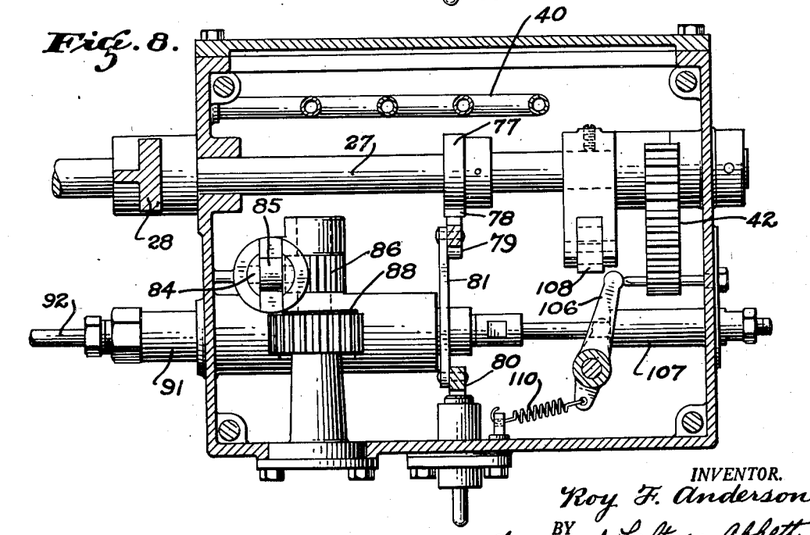
Fig. 8 is a plan section taken on line VIII—VIII of Fig. 9.
Figure 10:
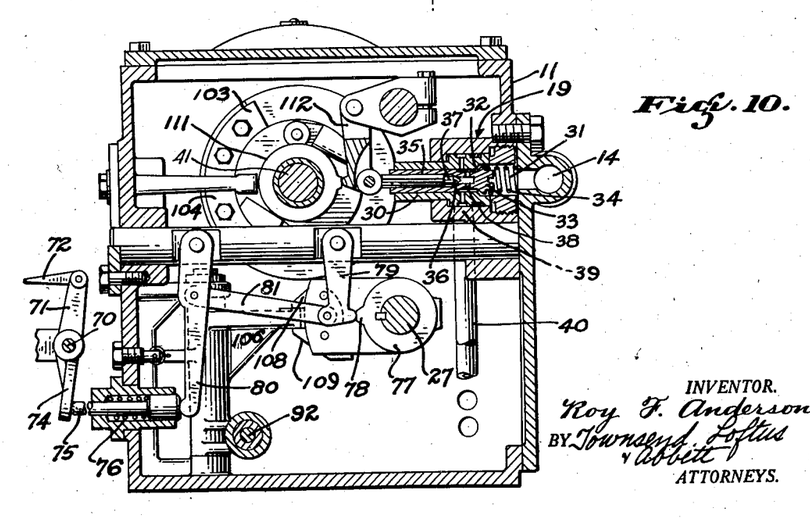
Fig. 10 is a transverse section through the control mechanism taken on line X—X of Fig. 9.

Mounted within the casing 11 are four air control valves 17, 18, 19 and 20 see Figs. 7 and 10 all of which are of identical construction. The valve 20 controls the flow of air to a starting valve 21 for opening the latter when it is desired to start the engine. This starting valve 21 may be of any preferred standard type and is interposed in an air line 22 leading from the air reservoir 16 to the engine air manifold. The valve 21 as illustrated in Fig. 3 may be of any standard construction and in the present instance is so constructed that when the valve is closed the air pressure in the air manifold will be relieved.

Figure 17:
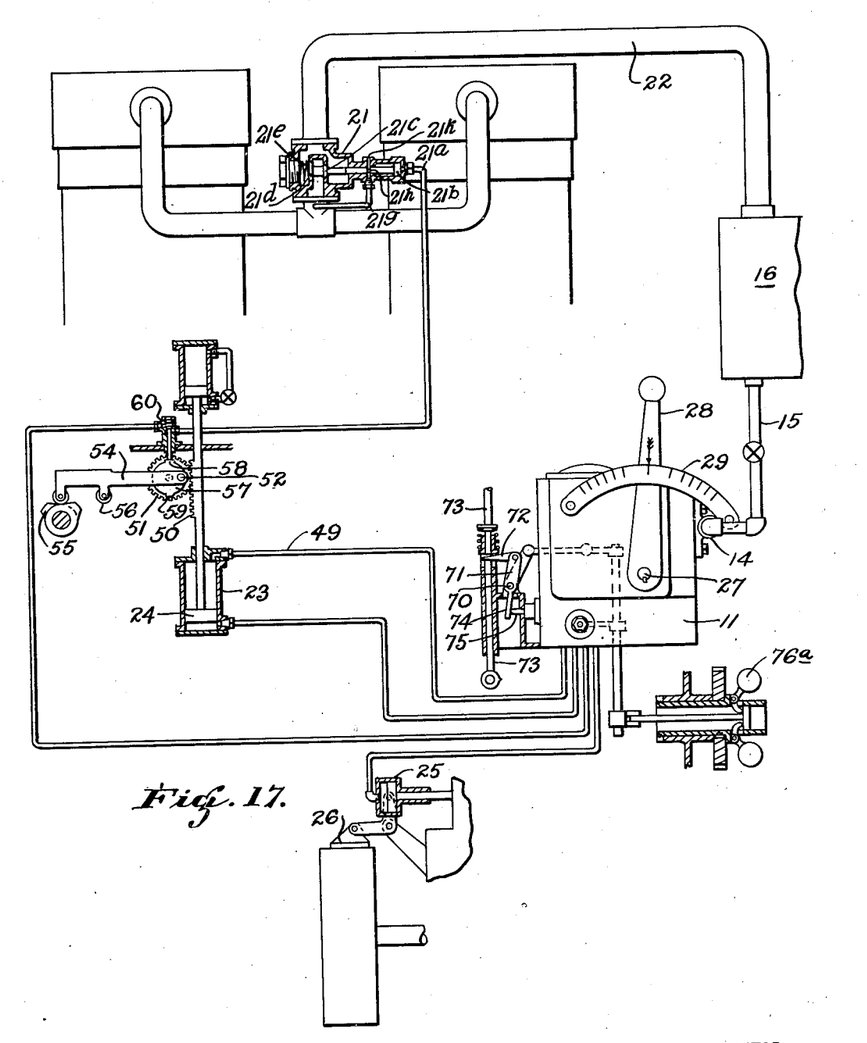
Fig. 17 is an organization view showing diagrammatically the several parts of the invention and the means connecting them for operation.

When the "intercepting valve 60" hereinafter referred to is open (see Figs. 1, 3, 4 and 17) there is permitted a flow of air through the air line 21ᵃ—provided the air line is otherwise open for permitting a flow of air to and through the intercepting valve 60—against a piston 21ᵇ whereby upon the consequent movement of the piston 21ᵇ to the left (see Fig. 17) there follows an opening of the air supply valve because of the moving of the movable air valve members thereof 21ᶜ and 21ᵈ against the pressure of the supply air which would otherwise hold the air valve closed and against the pressure of the spring 21ᵉ also tending to hold said air valve closed. A bleeder pipe 21ᵍ permits a bleeding of air from the piping at the discharge side of the air starting valve 21 whereby when the intercepting valve 60 is closed a flow or bleeding of air can take place through the pipe 21ᵍ past a groove or passageway 21ʰ in the spindle of the movable valve members, thence to atmosphere through opening 21ᵏ.

Figures 3, 4:
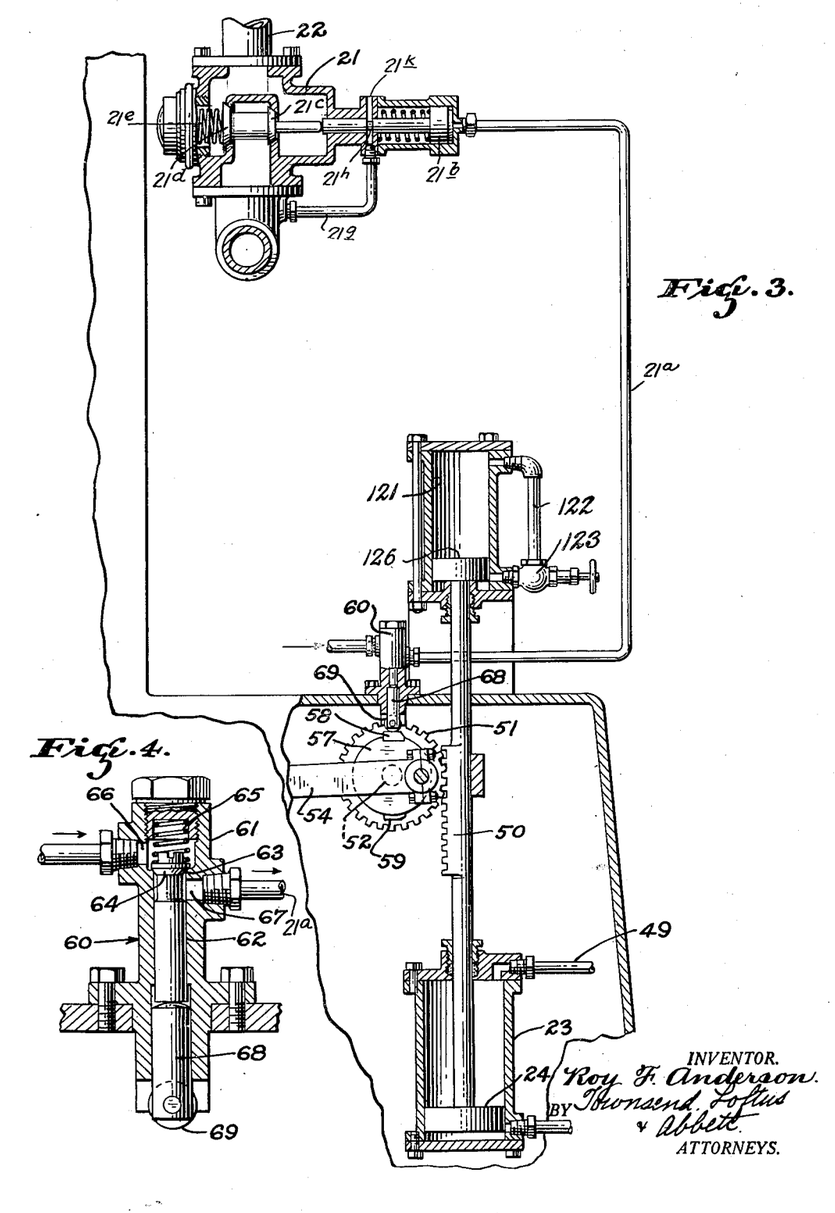
Fig. 3 is a fragmentary view showing the operative connection between the latch shaft and the reversing cylinder and the control for the starting valve.
Fig. 4 is an enlarged view in central section through the intercepting valve which prevents the flow of starting air to the starting valve until the valve gear has been properly set.

Th valves 17 and 18 are operatively connected with a reversing cylinder 23 as shown in Fig. 3, which reversing cylinder is fitted with a piston 24 which controls the setting of the valve gear and enables the engine to be operated either ahead or reverse.

The valve 19 in the housing 11 is operatively connected with a piston of an air cylinder 25 which in turn is operatively connected with a flywheel brake mechanism 26 see Fig. 1, so that when air is admitted to the cylinder 25 the brake 26 is applied to the flywheel to stop the engine. The cylinder 25 may be of any well known construction capable of applying pressure to the brake shoe 26. The air motor 25 shown comprises a fixed piston 25ᵃ and a movable cylinder or casing 25ᵇ the latter of which is pivotally connected at 26ᵃ to a lever construction provided by a bell crank member 26ᵇ having an arm pivotally connected at 26ᶜ to the brake shoe providing member 26ᵈ of the flywheel brake 26. The air for operating the motor is supplied through a flexible pipe line or tubular connection 25ᶜ.

The valves 17 to 20 inclusive are separately controlled in order that the various functions referred to may be accomplished.

To start the motor in a direction which is predetermined, I have provided a control shaft 27 see Figs. 6, 7, 8, 10 and 12 which is journalled at its ends in bearings formed in the housing 11 and which extends longitudinally of the housing. This control shaft is shown as fitted with an operating lever 28 but, however, the shaft 27 may be led to any desired remote point for operation if desired.

Mounted on the exterior of the housing contiguous to the lever 28 is a dial 29 on which are indicated the various positions the handle must assume in order to control the various valves 17 to 20 in placing the accessories in operation and also to regulate the fuel supply to the motor as will be described.

The valves 17 to 20 are most clearly illustrated in Fig. 10 where it will be seen that the valve includes a cage 30 stationarily mounted in the casing 11. This valve cage is formed with a central chamber 31 communicating at one end with the interior of the manifold 14 and at the other end with the interior of the casing which, of course, is at atmospheric pressure.

The inner end of the valve passageway 31 is slightly reduced in diameter and intermediate the two portions of the valve passageway is a valve seat 32 controlled by a valve member 33. A spring 34 is provided which constantly tends to maintain the valve seated. It will be noticed that the valve is so positioned relative to the seat 32 that the pressure entering the valve chamber from the manifold 14 will tend to maintain the valve seated. The valve member is formed with a central bore 35 which extends inwardly of the valve from the inner end thereof. This passageway is provided with a valve seat 36 intermediate its ends with which a valve member 37 cooperates. Between the valve seat and the extreme end of the base 35 are bleeder openings 38.

The valve seat 32 is so positioned that it will be intermediate that portion of the chamber which is in communication with the manifold and a discharge port 39 to which the air is delivered when the valve is open. This discharge port 39 is connected with a pipe which leads to the accessory controlled by the valve.

When the valve 33 is closed, the pressure in the line 40 may be relieved through the bleeder openings 38 which will unseat the valve 37 and pass into the atmosphere. Therefore, when the valve is to be operated, the valve 33 is moved in a direction against the spring 34 through the medium of the valve 37. A communication will then be established between the interior of the manifold 14 and the port 39 and the air will flow to the accessory connected with the said port. When the valve 33 is permitted to close, the valve 36 is free to open so that the pressure in the pipe connected with part 39 will open the valve 37 and be relieved.

When it is desired to start the engine and the direction of rotation is determined, the proper valve 17 or 18 is opened so as to direct air under pressure from the manifold to the reversing cylinder 23. If it is desired to start the engine ahead, the lever 28 is moved in the proper direction in accordance with the dial in Fig. 5, which movement of the lever 28 turns the control shaft 27. This rotation of the control shaft 27 imparts rotation to a cam shaft 41 mounted in the casing 11 in parallelism with the control shaft and in an operative position relative to the valves 17 to 20 inclusive. The axis of these valves just mentioned is at ninety degrees to the axis of the cam shaft.

The movement of the control shaft 27 is imparted to the cam shaft 41 through the medium of a segment 42 fixed on the control shaft 27 and in mesh with a pinion 43 fixed on the cam shaft 41. The ratio between the segment 42 and pinion 43 is such that the proper amount of rotating movement of the cam shaft will be had with a desired amount of movement of the control shaft.

Figure 9:
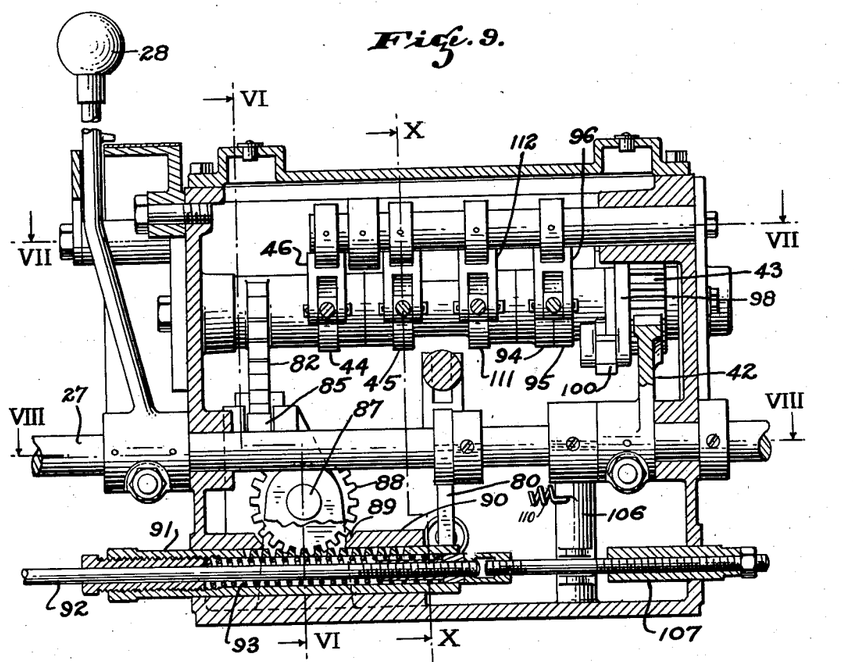
Fig. 9 is a section taken on the line IX—IX of Fig. 6 with the valves removed so as to expose the cam mechanism.
Figure 14:
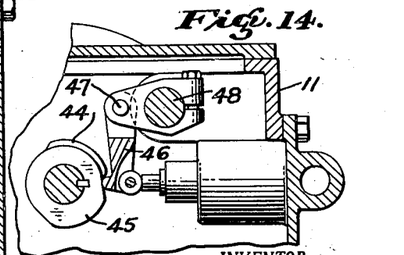
Fig. 14 is a fragmentary view in transverse section taken on line XIV—XIV of Fig. 11.

Fixed on the cam shaft 41 in operative relation to the valves 17 and 18 is an ahead cam 44 and an astern cam 45, see Figs. 7 and 9. Each cam is adapted to be engaged by a cam lever 46 (Fig. 14) pivotally suspended as at 47 from a stationary support 48 fixed in the housing 11. The lower end of these cam levers 46 are interposed between the cams and the valves, so that when the high point of the cams come in register with the lower ends of the cam levers, the valves will be opened.

When the control lever 28 is moved to start the engine in the ahead direction, the high point of the cam 44 will engage the lower end of the adjacent cam lever 46 and through the medium thereof open the valve member 38 of the valve 17. The discharge port of this valve is connected to a pipe 49 shown in Figs. 1 and 3 as leading to the upper end of the air cylinder 23. If the piston 24 in this air cylinder is in any other position but its lowermost one, it will be moved to this latter position.

The piston rod of the piston 24 is formed with a rack 50 which engages with a gear 51 secured on a valve gear control shaft 52. This valve gear control shaft, as shown in Fig. 15, is arranged in parallelism with the main cam shaft and is provided with a crank for each cylinder.

At the upper end of the piston rod for the piston head 24 of the reversing cylinder—to wit, at the upper end of the rod carrying the rack 50 as shown in Fig. 3—there is carried a piston head 126 which is located within an upper cylinder 121 and which may be termed as the damping cylinder since the function thereof is to provide a damping effect or a dash pot effect on the movements of the movable part of the reversing gear cylinder. This damping cylinder has a valve controlled bypass 122 leading from the interior of one end thereof to the interior of the other end thereof whereby by positioning the valve 123 in the bypass the speed of movements of the reversing gear can be controlled and particularly so as to prevent undue shocks incident to too fast movements which might otherwise follow.

The engine is so designed and constructed that two cams are provided for each of its intake and exhaust valves (not shown), these cams being relatively offset so that the setting of the valve gear will determine in which direction the engine will operate. In Fig. 15 a set of cams of a well known type for one valve is illustrated. The valve, of course, is connected with a push rod 53 which bears on a latch 54 connected at one end to the valve gear control shaft 52. The other end of this latch 54 carries two rollers 55 and 56, the roller 55 being in alignment with one cam and the roller 56 being in alignment with the other cam. These rollers are spaced apart in order that they may be separately placed in operative position relative to their particular cam so that the push rod 53 may be actuated by either of the cams as determined by the position of the valve control shaft 52.

Figure 15:
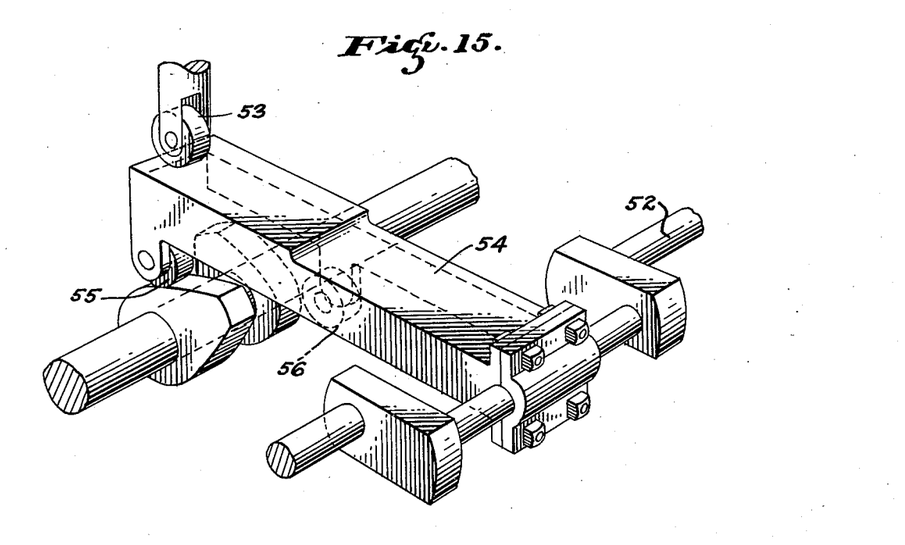
Fig. 15 is a fragmentary view in perspective showing a pair of cams for one valve and showing the manner in which the cams are placed into operation depending upon whether the engine is running ahead or astern.
Figure 16:
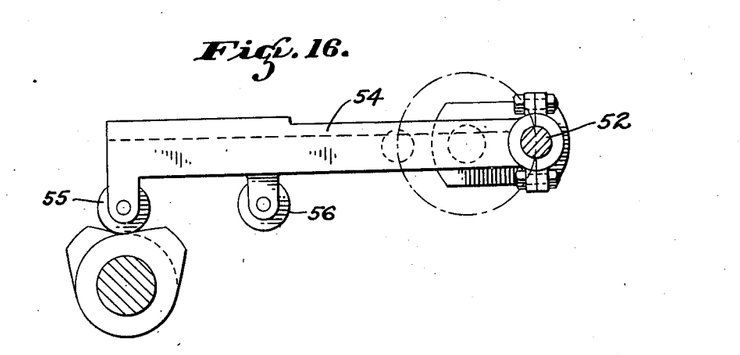
Fig. 16 is a diagrammatic view of the same mechanism.

In one position of the valve gear control shaft 52, see Figs. 15 and 16, the latch 54 is operated by one cam and when the control shaft is turned one hundred and eighty degrees, the latch 54 is actuated by the other cam. Thus, the valve gear can be so regulated through the medium of the control shaft that the engine will operate in reverse directions.

Figure 18:
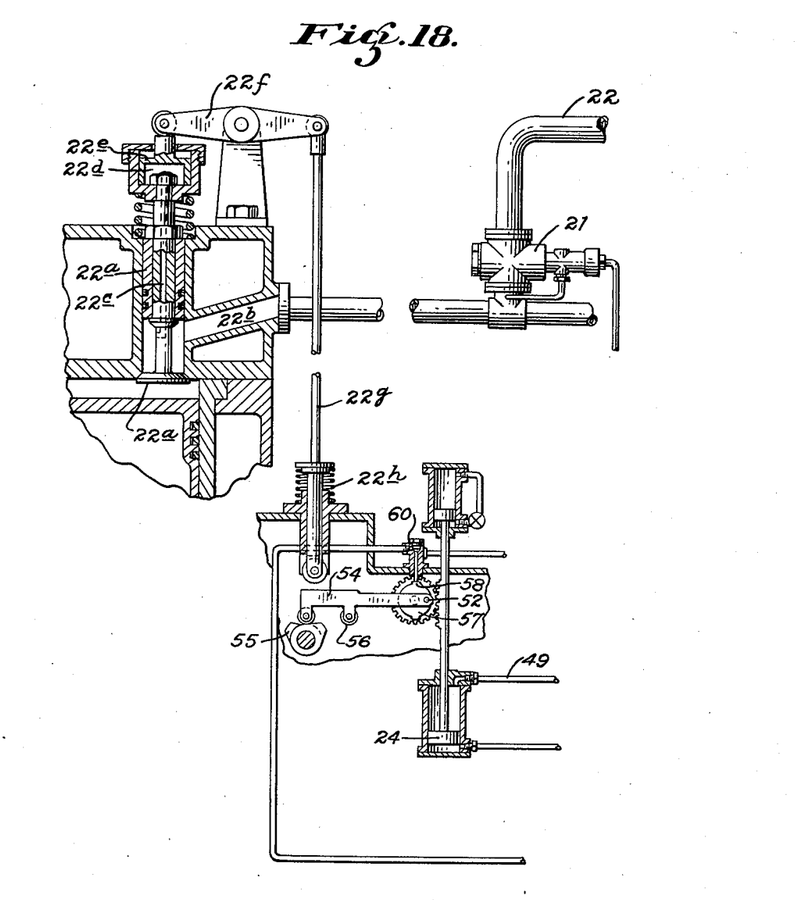
Fig. 18 is a schematic organization view showing diagrammatically the manner in which the air starting valve is actuated.

As in common practice, the engine is so designed that it may be started with air under pressure which is admitted on the power stroke and during four cycle operation. With reference to Fig. 18, it will be seen that the cylinder head is provided with an air inlet valve 22a for directing air from the starting valve 21 into the combustion chamber of the cylinder. This valve is a balanced valve and is of the conventional type which remains inoperative except when air under pressure is directed from the starting valve 21. That is to say, when air under pressure is being directed into the cylinder head through the passageway 22b from the starting valve 21, this air under pressure enters the passageway 22c in the stem of the valve 22a and passes upwardly into an air cylinder 22d. This pressure causes the piston 22e in the cylinder to move upwardly, moving the contacting end of the rocker arm 22f upwardly and lowering the other end of the rocker arm downwardly. This downward movement causes downward movement of the push rod 22g and places the roller at its lower end in contact with the latch 54. Each air inlet valve is provided with the same type of cam mechanism and reversing mechanism as each exhaust and inlet valve as just previously described. That is to say, that two cams are provided for each air inlet valve, which cams are relatively offset so that the setting of the valve gear will determine in which direction the engine will operate.

Figs. 15, 16, 17 and 18 fully illustrate this construction and it has been described hereinbefore in connection with the inlet and exhaust valves and it is deemed unnecessary to further describe this operation. It will suffice to say that when the valve gear is operated to reverse the operation of the inlet and exhaust valves, this reversing gear also functions in connection with the air starting valves so that they will function at the proper intervals.

When the air starting valve 21 is closed and no air is directed to the passageway 22b, the pressure of the spring 22h moves the push rod 22g upwardly, removing its cam roller from contact with the latch 54, so that the air inlet valves will be inoperative except when the air valve 21 is opened. It will be seen that this function follows due to the fact that there is no pressure in the cylinder 22d so that the piston 22e may remain in its lowermost position, allowing the lower end of the rocker arm 22f to lower and to enable the other end of the rocker arm to raise under the action of the spring 22h. It should be said that the type of air inlet valve shown in Fig. 18 is conventional.

It is obvious from Fig. 3 that the position of the piston 24 in the cylinder 23 will determine the position of the control shaft 52. That is, when the piston is at the lower end of its stroke, the control shaft will be in a position setting the valve gear so that the engine will operate in the ahead direction. When the piston 24 is at the opposite end of its stroke, the control shaft 52 will be turned one hundred eighty degrees so that the setting of the valve gear will be changed to the astern direction.

I have also provided a means for preventing opening of the starting valve 21 unless the valve gear is exactly in either the ahead position or astern position. This prevents opening of the air starting valve until the valve gear has been properly set for operation. I accomplish this by the provision of a disk 57 see Fig. 3 which is secured on the valve gear control shaft 52. This disk is in reality a cam and is provided with two high points 58 and 59 which are arranged one hundred eighty degrees apart.

Arranged in operative relation to this cam 57 is an intercepting valve 60 which is interposed in the air line between the valve 20 in the casing and the air starting valve 21. This valve as illustrated in Fig. 4 comprises a valve cage 61 having a central chamber 62 therein intermediate the ends of which is a valve seat 63. Cooperating with this valve seat is a reciprocable valve member 64. This valve member is normally held on its seat through the medium of a spring 65. The valve seat 63 is interposed between the intake port 66 of the valve cage and the outlet port 67 thereof, so that when the valve is seated air cannot be delivered from the air control valve 20 in the casing 11 to open the starting valve 21.

Arranged coaxially of the valve 64 in the valve cage 61 is a tappet 68, the upper end of which engages the lower end of the valve 64. The lower end of the tappet is provided with a tappet roller 69 adapted to engage the periphery of the cam 57. When the high points 58 and 59 are in register with the tappet 68, the valve 64 will be unseated and air may flow through the valve to the starting valve 21. However, when these high points 58 and 59 are not in register with the tappet, the valve 64 will be seated and air cannot be delivered to the starting valve 21.

The high points 58 and 59, as previously stated, are disposed one hundred eighty degrees apart and are so arranged about the periphery of the shaft 52 that the high point 58 will register with the tappet 68 when the valve setting is completed for running ahead. Likewise, when the high point 59 is in register with the tappet 68, the valve gear will be set in the astern position. At any point intermediate these high points, the valve gear will not be properly set and therefore the intercepting valve will be closed to prevent the flow of air to open the starting valve 21. This prevents starting air from being delivered to the engine during the time wherein the valve gear is being shifted from the ahead to the astern position or vice versa.

Figures 5, 6:
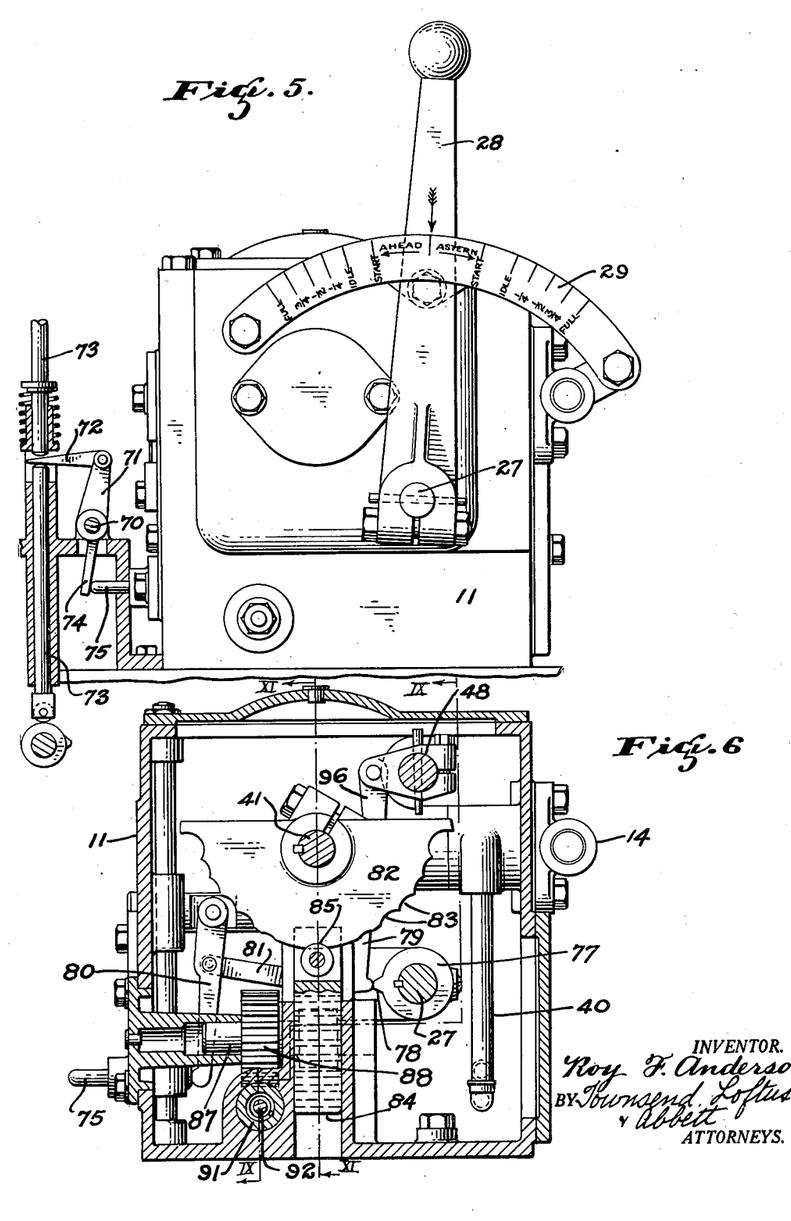
Fig. 5 is an end elevation of the control mechanism disclosing its connection with the wedge operating shaft.
Fig. 6 is a view in transverse section through the control mechanism taken on line VI—VI of Fig. 9.

When the lever 28 is moved from the stop or neutral position either to operate the engine in ahead or astern direction, the wedge shaft is operated to enable sufficient fuel for starting to be injected into the cylinders. In Figs. 5 and 10 the wedge shaft is indicated by the numeral 70. At each cylinder this shaft is provided with a lever 71, one end of which is connected with the wedge 72 interposed between the push rods 73 of the injection valve of the adjacent cylinder. Secured on the wedge shaft and depending therefrom is a lever 74 which depends to a position where it will be engaged by a plunger 75 reciprocably mounted in the casing 11. This plunger is engaged by a spring 76 which acts to maintain the plunger in a position enabling free operation of the wedges by the fuel control governor, which is illustrated at 76a in Figs. 1 and 2.

The plunger 75 (Fig. 5), however, is automatically operated when the control lever 28 is moved to stop position to withdraw the wedges to a point where fuel will no longer be injected into the cylinders. This is accomplished by the provision of a cam 77 (Figs. 6 and 10) fixed on the control shaft 27. This cam has a high point 78 at one point in its circumference. This high point through the medium of pivotal levers 79 and 80, which are connected together by a link 81, operates the plunger 75. When the control lever 28 and control shaft 27 are in the stop position, the high point of the cam 78 engages the lever 79 and through this lever and the lever 80 moves the plunger 75 to its outermost position. This outward movement of the plunger 76 will, through the medium of the lever 74, turn the wedge shaft 70 to a position withdrawing the wedges. However, when the control shaft 27 is rotated in either direction to start the engine, the high point 78 is moved out of register with the lever 79 and the spring 76 moves the plunger 75 to its innermost position, placing the wedge shaft 70 under the control of the fuel governor on the engine.

The control apparatus also includes a throttle which limits the maximum quantity of fuel at any given throttle setting so as to provide a manual speed control for the engine. This throttle mechanism includes a speed controlled sector 82 (Fig. 6) which is secured on the cam shaft 41. The periphery of this sector 82 is formed with a plurality of spaced notches 83 which are spaced at progressively increasing radii from the center of the shaft 41; that is, commencing at the center of the sector and passing through ninety degrees at one side. The other ninety degrees of the sector is identical except being of opposite hand. Engaged by the periphery of this sector is a rack 84. The upper end of this rack is fitted with a roller 85 bearing on the periphery of the sector 82.

The rack 84 is formed with rack teeth which are in mesh with a pinion 86 fixed on a stub shaft 87. Also fixed on the stub shaft is a gear 88 operating through a slot 89 formed in a guide 90. Reciprocably mounted in this guide 90 is a sleeve 91 through which the governor control rod 92 is reciprocably mounted. A comparison of Figs. 1 and 9 will show that when the governor is increasing its speed the rod 92 is moving to the left in Fig. 1 or to the right in Fig. 9. The sleeve 91 is formed with rack teeth which are in mesh with the gear 88. The interior construction of the sleeve 91 is such that rotation in one direction of the gear 88 increases the tension of a governor spring 93, while rotation in the other direction of the gear 88 decreases the tension of the governor spring 93. This varying of the tension of the spring 93 influences the governor action so as to control the wedges 72 and thereby control the speed of the engine. It being understood that the position of the wedges regulates the fuel feed as is common practice in Diesel engines. Therefore, the operating lever 28 or the shaft 27 can be utilized as a throttle lever after leaving the starting positions in either ahead or reverse.

As the sector 82 is notched and engages the roller 85, the different speeds at which it is desired to run the engine can be readily determined and likewise any particular setting of the shaft 27 will be maintained by engagement of the roller 85 with the notches in the periphery of the sector. Thus, any particular designated speed of the motor can be obtained from any remote point, through an operating lever or directly by rotation of the shaft 27.

Figure 11:
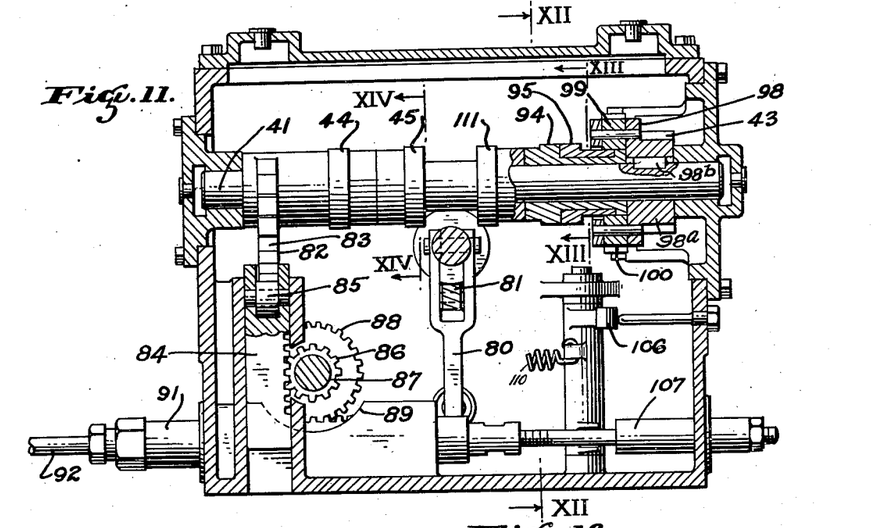
Fig. 11 is a longitudinal sectional view through the control mechanism showing a portion of the mechanism on the cam shaft in section, and taken on line XI—XI of Fig. 6.
Figure 12:
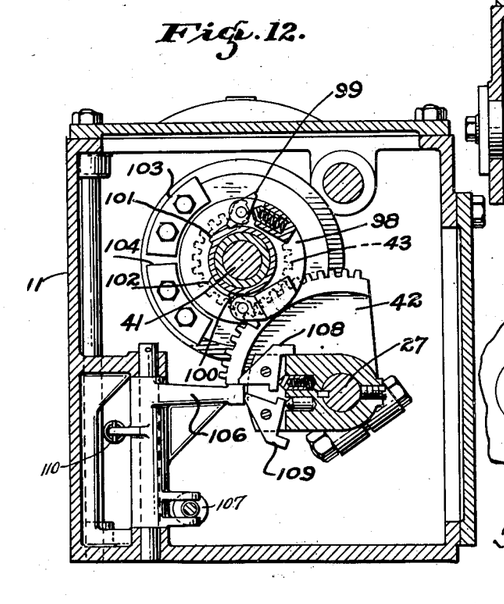
Fig. 12 is a transverse sectional view through the control mechanism taken on line XII—XII of Fig. 11.
Figure 13:
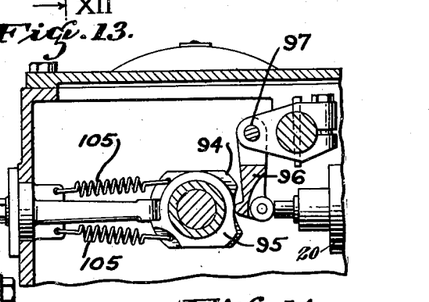
Fig. 13 is a fragmentary view in transverse section through the cam shaft taken on line XIII—XIII of Fig. 11.

To open the starting valve 21, the exhaust port of the control valve 20 is connected therewith through the intercepting valve 60 as previously described. To operate the control valve 20 the cam shaft 41 is provided with two relatively rotatable cams 94 and 95 (Figs. 7 and 9), one cam coming into operation when the engine is started ahead, the other cam coming into operation when the engine is started astern. Both of these cams are operatively positioned relative to a cam lever 96 pivotally mounted as at 97 and disposed with its lower end intermediate the cams and the plunger of the control valve 20. When the high point of either cam registers with the lower end of the lever, the control valve is opened. These cams are rotatably mounted relative to the cam shaft 41 and are operated as follows:

Mounted on the cam shaft 41 contiguous to the cams is a disk 98 (Figs. 11 and 12) which is fixed to the cam shaft. The hub 98ª of the disk 98 is secured to the cam shaft 41 through the medium of a key designated 98b. This disk carries two spring-pressed pawls 99 and 100, which pawls are so mounted as to be spring-pressed into engagement with the peripheral surfaces of the hubs of the cams 94 and 95. At the point where these hubs are adjacent, as indicated in Fig. 11, each hub is provided with a latch lug which are shown in Fig. 12 and numbered 101 and 102. When the cam shaft is rotated in the direction it is rotated when it is desired to start the engine ahead, the pawl 100 engages the lug 102 on the cam 94 and moves it into register with the lower end of the lever 96, consequently opening the control valve 20, admitting air to open the starting valve 21.

The movement of the operating lever or control shaft 27 from the stop to start position either ahead or astern is sufficient to move the high point of the selected cam 94 or 95 into engagement with the lower end of the cam lever 96 and open the control valve 20. The control valve 20 is held open as long as the lever 28 remains in start position. However, when the lever is moved to idle position or beyond, the cam which had been placed in operation is automatically released and returns to its normal position with its high point out of engagement with the cam lever 96, consequently closing the control valve 20 which also enables the starting valve 21 to close, shutting off the starting air to the cylinders. In other words, after the control lever 28 has been shifted to starting position and held there a length of time sufficient to turn the engine over and is then shifted to increase the fuel supply to the engine, the starting air is automatically shut off. This is accomplished by tripping either of the pawls 99 or 100 depending upon which cam 94 and 95 is operated.

To trip the pawls I provide two stationary tripping lugs 103 and 104 which are positioned to engage the pawls when the control lever 28 is moved beyond the start position either ahead or reverse. When the control lever 28 is moved beyond the start position ahead, the pawl 100 engages the lug 104 and disengages from the latch lug 102. When the lever 28 is moved from the start position ahead, the pawl 100 engages the lug 104 and disengages from the latch lug 102. When the lever 28 is moved from the start position astern toward the idle position, the pawl 99 engages the trip lug 103 and the pawl disengages from the latch lug 101, releasing the cam 95. Each of these cams is connected with a spring 105 which normally tend to return the cams to a position wherein their high points are out of register with the lower end of the cam lever 96.

In order to prevent the control lever 28 from being shifted from the ahead position to the astern position or vice versa before the engine has come to a complete stop, I have provided a latching mechanism most clearly indicated in Fig. 12. This latching mechanism comprises a pivotal latch arm 106 which is mounted to swing about a vertical axis. This latch arm is adapted to be operated by an abutment 107 fixed on the governor control rod 92 as shown in Fig. 9. When the engine commences operating, the governor, through the spreading of the governor weights, moves the rod 92 axially sufficient to cause the abutment 107 to engage the arm 106 and move it into operative position relative to a pair of latches 108 and 109 mounted on the control shaft 27. A spring 110 is connected with the latch arm 106 and constantly tends to maintain it out of operative relation relative to the latches 108 and 109.

As illustrated in Fig. 12, should an attempt be made to move the lever from the ahead to the astern position or vice versa during the period that the motor is in operation, the proper latch 108 and 109 will engage the latch bar 106 and prevent movement of the control shaft beyond the stop position. The moment the engine ceases operating, the governor weights collapse and the governor spring urges the governor control rod 92 in a direction moving the abutment 107 on the control rod out of engagement with the latch arm 106 and enables the spring 110 to move the latch arm 106 into its inoperative position where it will not be engaged by the latches 108 and 109.

In operation, assuming that the control shaft 27 is in stop position and the remainder of the parts are in neutral and that the engine is ready to be commenced, if it is desired to run the engine in the ahead direction, the lever 28 is shifted to the start position as indicated on the dial 29 which will align the first notch on the sector 82 with the roller on the rack 84. Simultaneously with this the cam 94 will actuate the cam arm 96 to open the control valve 20 and deliver air to open the starting valve 21, admitting starting air to the cylinders.

If the valve gear is set in the ahead position, there will be no operation of the reversing cylinder 23. Therefore, the intercepting valve 50 will be open enabling prompt operation of the starting valve 20. When in the start position there is sufficient fuel delivery to enable the engine to start. Also, the moment the lever 28 is shifted to the start position, the cam 77 will have been turned to remove its high point from engagement with the lever 79 and will have released the wedge shaft, so that the latter will be under the control of the engine governor.

As soon as the engine has commenced operating, the lever may be shifted to the idle position and through the intermediate speeds to full speed, depending upon which is desired. The moment that the lever is moved from the starting position to increase the engine speed, the cam 95 will be tripped so as to cut off the air to the starting valve 21 and automatically shut off starting air to the engine.

If it is desired to reverse the engine, the lever is moved back to stop position. The moment that it reaches this position, the high point on a brake cam 111 will, through the medium of a cam arm 112, open the brake control valve 19 and actuate the cylinder 25 to apply the brake 26 to the flywheel. At the same time the cam 77 will be turned to place its high point in engagement with the lever 79 which will cause the plunger 75 to actuate the wedge shaft and withdraw the wedges.

The moment the governor weights collapse, which is when the engine is stopped, the latch bar 106 will automatically move out of position, enabling the lever 28 and the shaft 27 to be moved to place the mechanism in reverse. During the time the engine is in operation, however, in the ahead speed, the latch bar 106 will be positioned where it will be engaged by the latch 108 so as to prevent the lever and shaft 28 and 27 to be moved to reverse the engine until the engine has entirely ceased operation.

After the engine has stopped and it is desired to operate it in the reverse direction, the handle is moved to start position on the astern portion of the dial 29. The moment this occurs, the cam 45 will cause its cam lever 46 to open the control valve 18 and deliver air to the lower end of the reversing cylinder 23. The upper stroke of this piston will be sufficient to impart one hundred and eighty degrees of rotation to the valve gear control shaft 52 which will reset the valve gear for reverse operation as previously described.

The moment the valve control shaft 52 commences its one hundred and eighty degrees of rotation, the high point 58 will move out of register with the tappet 68 of the intercepting valve and this valve will close, preventing opening of the starting valve 21. However, as the control shaft 52 reaches the end of its one hundred and eighty degrees of rotation, the high point 59 on the cam 57 will raise the tappet 68 of the intercepting valve and open the same, enabling air to be delivered to the starting valve 21 to open it and thus deliver starting air to the engine.

Simultaneously with the opening of the control valve 19, the control valve 20 will be opened as previously described, so that air will pass through the intercepting valve to open the starting valve 21 so that starting air may be delivered to the cylinders. Simultaneously with the opening of these control valves 19, the wedge shaft will be released by the cam 77 so that the governor may operate the wedge shaft.

As soon as the lever 28 has left its stop position toward the start position, the high point on the cam 111 will move from engagement with its cam lever 112 and enable the control valve 19 to close, cutting off the delivery of air to the brake cylinder 25 so that as this cylinder is bled, the brake 26 will release.

As the lever is shifted further in the astern direction so that a higher speed of the engine will be attained, the cam 95 will be tripped as previously described and the air to the starting valve 21 will be cut off so that the delivery of starting air to the engine will be discontinued. The engine will then be operating in a reverse direction and its speed will depend upon the position of the control shaft 70 and the influence thereof on the governor spring through the medium of the sector and associate mechanism.

I desire to particularly point out that the shaft 27 is shown as operated directly at the engine.

From the foregoing it is obvious that I have provided a unit control for a Diesel engine wherein the starting, stopping, reversing and speed control may all be accomplished from a single point.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination with an internal combustion engine of the character described, a control member movable in either direction from a neutral position, a reversing gear, an operative connection between the reversing gear and said control member whereby initial movement of said control member in either direction will properly position the reversing gear, a starting valve, means for opening said starting valve, said means being actuated by said control member after it has moved a predetermined amount in either direction from neutral position, a flywheel brake, actuating means for said brake, said actuating means being operatively associated with said control member and controlled thereby whereby the brake will be applied when the control member is in neutral position and released when the control member is moved from neutral position.

2. In combination with an internal combustion engine of the character described, a control member movable in either direction from a neutral position, a reversing gear, an operative connection between the reversing gear and said control member whereby initial movement of said control member in either direction will properly position the reversing gear, a starting valve, means for opening said starting valve, said means being actuated by said control member after it has moved a predetermined amount in either direction from neutral position, a flywheel brake, actuating means for said brake, said actuating means being operatively associated with said control member and controlled thereby whereby the brake will be applied when the control member is in neutral position and released when the control member is moved from neutral position, said engine having means regulating the fuel supply, a connection between said means and said control member whereby said means will be influenced by operation of the control member in either direction from neutral position to gradually increase the fuel supply as the control member is moved from neutral in either direction.

3. In combination with an internal combustion engine of the character described, a control member movable in either direction from a neutral position, a reversing gear, an operative connection between the reversing gear and said control member whereby initial movement of said control member in either direction will properly position the reversing gear, a starting valve, means for opening said starting valve, said means being actuated by said control member after it has moved a predetermined amount in either direction from neutral position, a flywheel brake, actuating means for said brake, said actuating means being operatively associated with said control member and controlled thereby whereby the brake will be applied when the control member is in neutral position and released when the control member is moved from neutral position, and means operated by said control member to automatically cut off the fuel supply to the engine cylinders when the control member is positioned in neutral position, said control member reestablishing the fuel supply to the cylinders after the control member is moved a predetermined amount in either direction from neutral.

4. In combination with an internal combustion engine of the character described, a reversing gear, a control member movable in either direction from a neutral position, and actuating means operatively associated with said control member and with said reversing means whereby movement of said member in one direction from neutral will position said reversing gear in astern position, and movement of said control member in the opposite direction will position the reversing gear in ahead position, a starting valve associated with the engine cylinders, a source of air under pressure connected with the starting valve for operating the same, a control valve intermediate the starting valve and said source of air under pressure, an air intercepting valve between said source of air pressure and said engine cylinders, and means actuated by the control member to open said control valve when the control member is moved a predetermined amount in either direction from neutral position, and means operatively controlled from the reversing gear for actuating said intercepting valve for preventing the delivery of air through said starting valve until said reversing gear has been properly positioned.

5. In combination with an internal combustion engine, a flywheel brake, a starting valve, a control member movable in either direction from a neutral position, means actuated by the control member for setting said brake when it is in a neutral position, means including air lines for releasing said brake and opening the starting valve when the control member is moved in either direction, an intercepting valve in the air line leading to the starting valve, and means controlled by the control member for opening said intercepting valve only when said brake has been released.

6. In combination with an internal combustion engine, a flywheel brake, a starting valve, a control member movable in either direction from a neutral position, means actuated by the control member for setting said brake when it is in a neutral position, means including air lines for releasing said brake and opening the starting valve when the control member is moved in either direction, an intercepting valve in the air line leading to the starting valve, and means maintaining said intercepting valve closed to prevent operation of the starting valve during the time that the brake is set.

7. In combination with an internal combustion engine of the character described, a reversing gear, a starting valve, a flywheel brake, a speed control apparatus, and a single operating mechanism operatively associated with said reversing gear, said starting valve, said flywheel brake and said speed control apparatus for controlling the same, said operating mechanism including means to hold the flywheel brake on and means to prevent operation of the starting valve except when the reversing gear is in either "full ahead" or "full astern" position.

ROY F. ANDERSON.